(12) United States Patent
Haas et al.

(10) Patent No.: US 10,773,759 B2
(45) Date of Patent: Sep. 15, 2020

(54) METHOD FOR LATERAL DYNAMIC STABILIZATION OF A SINGLE-TRACK MOTOR VEHICLE

(71) Applicant: Robert Bosch GmbH, Stuttgart (DE)

(72) Inventors: Hardy Haas, Ditzingen-Schoeckingen (DE); Anja Wahl, Markgroeningen (DE); Matthias Klews, Tübingen (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 16/310,483

(22) PCT Filed: Apr. 12, 2017

(86) PCT No.: PCT/EP2017/058831
§ 371 (c)(1),
(2) Date: Dec. 17, 2018

(87) PCT Pub. No.: WO2018/001587
PCT Pub. Date: Jan. 4, 2018

(65) Prior Publication Data
US 2019/0263460 A1    Aug. 29, 2019

(30) Foreign Application Priority Data

Jun. 27, 2016  (DE) ......................... 10 2016 211 421

(51) Int. Cl.
*B62D 37/04*   (2006.01)
*B60W 30/045*  (2012.01)
(Continued)

(52) U.S. Cl.
CPC ............. *B62D 37/04* (2013.01); *B60W 30/02* (2013.01); *B60W 30/045* (2013.01);
(Continued)

(58) Field of Classification Search
None
See application file for complete search history.

(56) References Cited

U.S. PATENT DOCUMENTS 4,203,500 A * 5/1980 Kamiya ................... B62H 1/12
                                                      180/219
4,691,798 A * 9/1987 Engelbach ............... B62H 1/12
                                                      180/209
(Continued)

FOREIGN PATENT DOCUMENTS

DE         10239139 A1    3/2004
DE       102013212606 A1  12/2014
WO         2008074608 A1   6/2008

OTHER PUBLICATIONS

International Search Report for PCT/EP2017/058831, dated Jul. 4, 2017.

*Primary Examiner* — Drew J Brown
(74) *Attorney, Agent, or Firm* — Norton Rose Fulbright US LLP; Gerard A. Messina

(57) ABSTRACT

A method for lateral dynamic stabilization of a single-track motor vehicle during cornering; on the left side of the vehicle, the motor vehicle including at least one first nozzle, which is mounted at a first position located between the wheels, and through which a medium situated in a first container may escape into the surroundings of the motor vehicle, with a speed component pointed in the outer direction of the left side of the vehicle; and on the right side of the vehicle, the motor vehicle including at least one second nozzle, which is mounted at a second position located between the wheels, and through which a medium situated in a second container may escape into the surroundings of the motor vehicle, with a speed component pointed in the outer direction of the right side of the vehicle; —where a presence of an unstable driving condition in a lateral direc- (Continued)

tion of the vehicle is detected, and—as a function of this, with the aid of an actuator system, on only one side of the vehicle, the medium is caused to escape through the at least one nozzle mounted on this side of the vehicle, in order to stabilize the motor vehicle.

15 Claims, 1 Drawing Sheet

(51) Int. Cl.
*B60W 40/101* (2012.01)
*B60W 40/112* (2012.01)
*B60W 30/02* (2012.01)
*B62K 11/04* (2006.01)
*B60W 40/103* (2012.01)
*B60W 30/04* (2006.01)
*B62J 45/415* (2020.01)

(52) U.S. Cl.
CPC ........ *B60W 40/101* (2013.01); *B60W 40/103* (2013.01); *B60W 40/112* (2013.01); *B62K 11/04* (2013.01); *B60W 2030/043* (2013.01); *B60W 2300/36* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2520/20* (2013.01); *B60W 2520/28* (2013.01); *B62J 45/4151* (2020.02)

(56) References Cited

U.S. PATENT DOCUMENTS

| | | | |
|---|---|---|---|
| 7,055,843 B2* | 6/2006 | Kan | B62J 27/00 |
| | | | 280/291 |
| 7,384,055 B1 | 6/2008 | Halpern | |
| 7,451,994 B2* | 11/2008 | Heitner | B62H 1/10 |
| | | | 280/288.4 |
| 2005/0167961 A1* | 8/2005 | Murata | B62H 1/12 |
| | | | 280/755 |
| 2012/0152639 A1 | 6/2012 | Holland et al. | |
| 2015/0314781 A1* | 11/2015 | Klews | B60W 10/04 |
| | | | 701/71 |
| 2016/0061132 A1* | 3/2016 | Hieda | F02D 41/10 |
| | | | 701/110 |
| 2016/0161526 A1* | 6/2016 | Miki | B60T 8/172 |
| | | | 701/124 |
| 2016/0368546 A1* | 12/2016 | Wahl | B60W 30/04 |
| 2019/0023264 A1* | 1/2019 | Mizutani | B60T 8/1706 |

* cited by examiner

METHOD FOR LATERAL DYNAMIC STABILIZATION OF A SINGLE-TRACK MOTOR VEHICLE

BACKGROUND INFORMATION

A frequent cause of motorized two-wheeled vehicle accidents during cornering, in which there is no outside involvement, is excessive oversteer or understeer of the vehicle, accompanied by the lateral skidding-out of one or two wheels. These situations are mainly caused by excessive cornering speeds, overly sharp acceleration in an inclined position or changes in the coefficient of friction between the tire and the road. In particular, in the case last mentioned, a decreasing coefficient of friction that abruptly increases again, already after a short distance, may result in so-called highsiders, in which the motorcycle flips over.

Highly effective vehicle dynamics control systems for preventing excessive oversteer or understeer are widespread in two-track vehicles. In the case of two-wheeled vehicles or single-track vehicles, the one-sided braking typical as an intervention option in two-track vehicles is not possible, due to construction. For the above-mentioned case of overly sharp acceleration in the inclined position, which causes the rear end to tail out due to skidding of the rear wheel, only systems for traction control are becoming increasingly prevalent.

German Published Patent Application No. 10 2013 212 606 describes a method for lateral dynamic stabilization of a single-track motor vehicle during cornering, where the presence of an unstable driving condition in the lateral direction of the vehicle is detected, and as a function of this, at least one nozzle, through which a medium flows out perpendicularly to the wheel plane of a vehicle, is controlled in order to stabilize the motor vehicle.

SUMMARY

The present invention relates to a method for lateral dynamic stabilization of a single-track motor vehicle or motorcycle during cornering; on the left side of the vehicle, the motor vehicle including at least one first nozzle, which is mounted at a first position located between the two wheels of the motor vehicle, and through which a medium situated in a first container may escape into the unconfined surroundings of the vehicle, with a speed component pointed in the outer direction or normal direction of the left side of the vehicle; and on the right side of the vehicle, the motor vehicle including at least one second nozzle, which is mounted at a second position located between the two wheels, and through which a medium situated in a second container may escape into the unconfined surroundings of the motor vehicle, with a speed component pointed in the outer direction or normal direction of the right side of the vehicle;

where a presence of an unstable driving condition in a lateral direction of the vehicle is detected, and
as a function of this, with the aid of an actuator system, on only one side of the vehicle, the medium is caused to escape through the at least one nozzle mounted on this side of the vehicle, in order to stabilize the motor vehicle.

The present invention allows lateral forces acting specifically upon the motor vehicle to be generated, and thus, to contribute to the stabilization of the single-track motor vehicle. Using simulations, a mounting location of the nozzles situated between the two wheels of the single-track motor vehicle has proven to be particularly effective. In this context, the term, "between the two wheels" refers to the position of the mounting location with respect to the longitudinal vehicle direction; that is, the nozzles are mounted between the wheels in the longitudinal vehicle direction or have a longitudinal vehicle coordinate situated between the wheels. Regarding the vertical vehicle direction or the vertical vehicle coordinate, the mounting location may perfectly well be above the wheels. In this instance, the actuator system is used, in particular, for controlling the nozzles, that is, their opening operation.

One advantageous refinement of the present invention is characterized in that the unstable driving condition is oversteer or understeer or lateral skidding of the two wheels of the motor vehicle. Oversteer is often the cause of lateral skidding of the rear wheel, understeer is often the cause of lateral skidding of the front wheel. These driving situations may be detected by evaluating the tire slip angle of the rear and front wheels. Lateral skidding of the two wheels may be detected, for example, with the aid of the transverse acceleration signal. If the two wheels skid away laterally in the same manner, then this may also be detected via the tire slip angle. In this case, these are of equal value at the front and rear wheels, that is, the difference in the tire slip angles disappears.

One advantageous refinement of the present invention is characterized in that the sideslip angle of the motor vehicle is ascertained, and that an unstable driving condition is then detected as being present, when the sideslip angle and/or the sideslip angular velocity and/or at least one tire slip angle and/or at least one tire slip angular velocity exceed a respectively specified limiting value or threshold value. In this context, the tire slip angular velocity is to be understood as the rate of increase of the tire slip angle.

One advantageous refinement of the present invention is characterized in that the tire slip angle of the front wheel and/or of the rear wheel of the motor vehicle is ascertained, and that an unstable driving condition in the lateral direction of the vehicle is then detected as being present, if the tire slip angle increases with time and the tire slip angle and/or its rate of increase exceed a respectively specified threshold value.

One advantageous refinement of the present invention is characterized in that the first position and the second position are located on the frame, the engine block or the body.

One advantageous refinement of the present invention is characterized in that the first and second nozzles are mounted above the center of gravity, and that in response to the presence of an unstable driving condition in the lateral direction of the vehicle, the medium flows out through the at least one nozzle on the inside of the curve.

One advantageous refinement of the present invention is characterized in that the first and second nozzles are mounted below the center of gravity, and that in response to the presence of an unstable driving condition in the lateral direction of the vehicle, the medium flows out through the at least one nozzle on the outside of the curve.

One advantageous embodiment of the present invention is characterized in that the medium is a gas stored in a pressure vessel.

One advantageous refinement of the present invention is characterized in that the gas is carbon dioxide, nitrogen, helium, argon or air.

One advantageous refinement of the present invention is characterized in that the medium is a liquid.

One advantageous refinement of the present invention is characterized in that the liquid is compressed water.

One advantageous refinement of the present invention is characterized in that the medium is a gas formed in response to combustion carried out at the container.

One advantageous refinement of the present invention is characterized in that a lateral inclination variable indicating the lateral inclination angle of the motor vehicle is ascertained and the orientation of the exhaust port of the controlled nozzle is changed as a function of the lateral inclination variable.

One advantageous refinement of the present invention is characterized in that the first and second containers are a common container. This common container then supplies the two nozzles with the medium; in response to occurring instability, the nozzle or nozzles on one side of the vehicle being opened as a function of the driving situation of the motor vehicle.

In addition, the present invention includes an apparatus having devices, which are configured to implement the methods according to the present invention. In particular, it is a control unit, which is provided with the program code for implementing the method of the present invention.

BRIEF DESCRIPTION OF THE DRAWINGS

FIG. 1 shows the side view of a motorcycle, in which the components playing a role in the present invention are drawn in.

DETAILED DESCRIPTION

Figure 1:
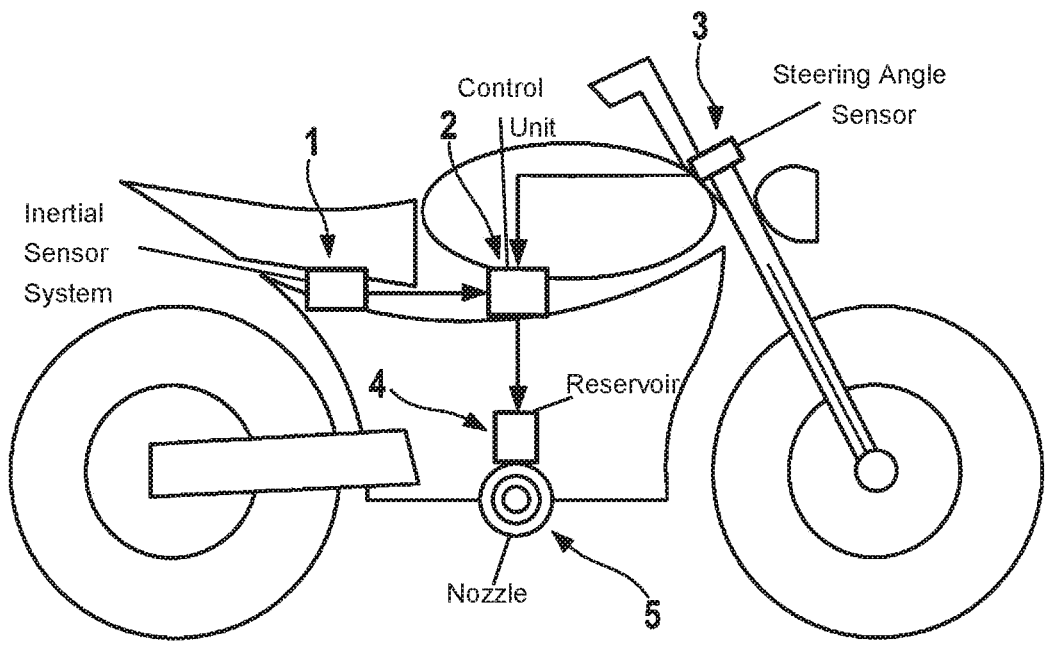

Using the present invention, driving situations, in which the wheels threaten to skid out, are detected with the aid of sensors, whereupon nozzles mounted to the motorcycle are controlled. Gases are discharged from these nozzles, which, due to the recoil, introduce transverse forces to the vehicle, e.g., to the frame, body or engine block, so that the lateral skidding-out of wheels is prevented.

For example, a cluster of inertial sensors and a steering angle sensor are used to detect situations including oversteer or understeer and/or an unstable driving condition. The required inertial sensors, which ascertain, in particular, the rates of rotation of the motorcycle about the three spatial directions and, in some instances, the occurring accelerations in the three spatial directions, as well, are sometimes already available in modern motorcycles. Using nozzles installed on the vehicle, whose openings point at right angles to the direction of travel, an option is provided of introducing, with the aid of a discharging support material, additional transverse forces into the chassis via the recoil principle and consequently preventing lateral skidding-out of the wheels. It has been established that the media vessels or media containers should be attached, in particular, to the frame or to the spring-mounted mass, approximately in the middle in the longitudinal direction of the motorcycle. In this manner, the weight of the unsprung masses does not increase, and the driving dynamics are influenced correspondingly less. Accommodation of the system, e.g., integration in the area of the engine, is also simpler to achieve technically and less disturbing optically. In the case of attaching the nozzles below the center of gravity, the medium flows out in the direction of the outside of the curve, so that wheels skidding out are pushed by the recoil in the direction of the inside of the curve. If the nozzles are mounted above the center of gravity, the medium comes out in the direction of the inside of the curve, so that in the case of wheels skidding out laterally, an instance of toppling in the direction of the inside of the curve is prevented.

In one specific embodiment, an inertial sensor cluster, which may measure the accelerations in the three spatial directions, yaw, roll and pitch rates, is installed in the motorcycle. The wheel rotational frequencies for estimating the vehicle speed are also available as a sensor variable in nearly all motorcycles. Using these variables, the sideslip angle or the tire slip angle is then estimated in a control unit. During a stable ride, the sideslip angle and the tire slip angle are typically only a few degrees. In the case of an abrupt increase in the sideslip angle or tire slip angle, it is to be assumed that the rear axle is tailing out. If a steering angle sensor is additionally used, then understeering situations, in which there is a risk of a front wheel skidding out, may also be detected. These understeering situations are characterized in that in the case of large steering angles, the sideslip angle is disproportionately small. In this case, as well, if a suitable sensor system is present, then, as an alternative to the sideslip angle, the tire slip angle of the wheels may also be used as a controlled variable.

Nozzles, whose discharge orifices point substantially in the lateral direction of the motorcycle, are mounted to the frame of the motorcycle on both the right and left. These nozzles are controlled in accordance with the calculated, required force. The greater the required force, the greater the mass flow rate of the medium escaping from the nozzle openings, as well. If the rate of outflow v_medium of the escaping medium is assumed to be constant, then, for the force characteristic F(t) calculated by the control unit, one obtains the impulse $\Delta p = \int F(t)dt = v\_medium \cdot \Delta m$ in the direction transverse with respect to the wheel axles, where $\Delta m$ denotes the mass flowing through the nozzle openings. Using this measure, the lateral skidding of the motorcycle is counteracted. If the tire slip angles re-assume non-critical values, then the activity of the nozzles is stopped again.

In the case of nozzles mounted below the center of gravity, the following applies: Through the discharge of the medium in the lateral direction of the vehicle system, in the direction of the outside of the curve, during rapid cornering, that is, at a markedly inclined position, one obtains, in the road system, a lateral force component and, in addition, an increase in the contact patch force of the wheel, which increases the friction between the tire and the road. As an option, it is also conceivable to actively render the outflow direction a function of the inclined position, by rotating the nozzles, so that in the road system, either only a transverse force component is present, or only an increase in the contact patch force of the wheel. In this context, fluid only flows through the nozzle pointing in the direction of the outside of the curve, so that wheels skidding outwards are pushed in the direction of the inside of the curve.

It is also conceivable to mount the nozzles above the center of gravity; then, the medium flows out in the direction of the inside of the curve, that is, only the nozzle on the inside of the curve is controlled and/or opened. In this manner, when the wheels are skidding away laterally, the motorcycle is prevented from toppling in the direction of the inside of the curve.

The outflow of the medium is directed independently of the mounting of the nozzles with respect to the center of gravity, and the medium flows out into the open surroundings.

A simplification of the system provides that the entire supporting material available flow out in an uncontrolled manner. In simulations, this has proven to be suitable in many driving situations. In this instance, only one valve is needed for controlling either the left or the right nozzle; a common material tank is sufficient. To this end, it is sufficient for the valve to be opened once. As an alternative, the nozzles may be connected to separate material tanks and controlled by valves. However, in the case of uncontrolled outflow, the supporting mass must not be too large, in order to prevent the motorcycle from over-pivoting. A rupture disk or rupture disks, which are caused to rupture with the aid of pyrotechnics, may also be used in place of the valve or valves.

Gases flowing out of compressed air cylinders, which are installed in the motorcycle, are filled, e.g., with carbon dioxide, nitrogen, helium, argon or compressed air, and are situated in pressure vessels installed on the motorcycle, are available for supplying the nozzles with supporting material. Compressed liquids, such as compressed water, may also be used in place of gases.

An alternative option is the combustion of fuels or propellants, whose products of combustion flow through the nozzles at high pressure in accordance with the rocket principle. For this, additional fuel tanks and ignition devices are installed.

In order to prevent unwanted rotation of the fork in response to the abrupt commencement of the nozzle activity at the front axle, a steering damper or steering torque controller may be installed on the fork. The unwanted, additional steering torque may be compensated for by these components.

In order to put the surroundings at lesser risk from the abrupt escape of gases at high pressure, the discharge orifices may be designed to have a radiation characteristic that fans out as widely as possible, so that the pressure rapidly decreases with increasing distance from the orifices. It is also conceivable for the discharge orifices to not be mounted parallel to the wheel plane, but turned upwards. Since the opening typically takes place during instances of cornering, that is, at a markedly inclined position, the opening of the outlet nozzle then points at least partially upwards during the discharge of the gas. Using such a mounting of the outlet nozzles, the desired lateral component of the force does decrease, but in return, the contact pressure at the center of tire contact is increased, which also counteracts lateral drifting of the wheel.

The side view of a motorcycle is depicted in FIG. 1. In this context, numeral 1 denotes an inertial sensor system installed in or on the motorcycle. Numeral 2 denotes a control unit, in which, for example, the algorithms for situation recognition and for calculating the nozzle actions, as well as for steering stabilization, are executed. Numeral 3 denotes a steering angle sensor. Numeral 4 denotes a material reservoir, as well as the actuator system for controlling the nozzles. Numeral 5 denotes the nozzle on one side of the motorcycle.

Figure 2:
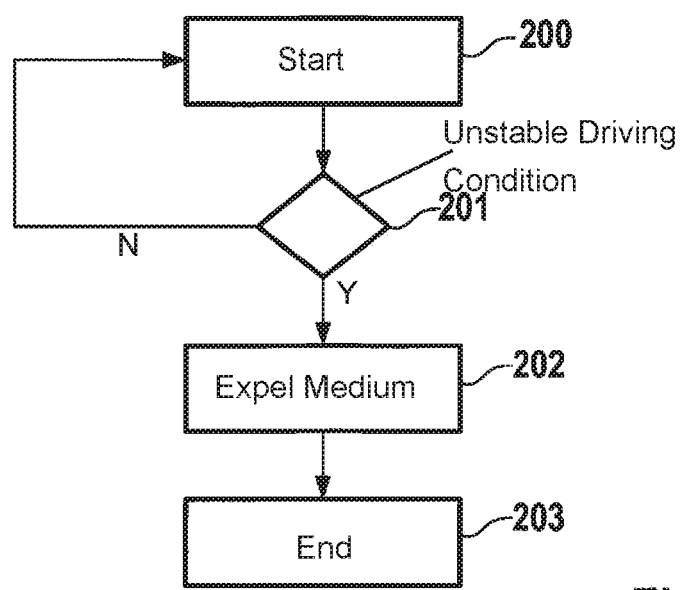
FIG. 2 shows the basic operation of the method according to the present invention.

The basic operating sequence of the method according to the present invention is represented in FIG. 2. After the start of the method in block 200, in block 201, a query is made as to whether an unstable driving condition in the lateral vehicle direction is present. If this is not the case, then a return is made to block 200. However, if this is the case, then, in block 202, a medium is expelled through a nozzle into the outside air, on one side of the vehicle. The method ends in block 203.

What is claimed is:

1. A method for lateral dynamic stabilization of a single-track motor vehicle during cornering, the method comprising:
    detecting a presence of an unstable driving condition in a lateral direction of the motor vehicle, wherein on a left side of the motor vehicle, the motor vehicle includes at least one first nozzle that is mounted at a first position located between wheels of the motor vehicle, wherein a medium situated in a first container is capable of escaping through the first nozzle into surroundings of the motor vehicle with a speed component pointed in an outer direction of the left side of the motor vehicle, wherein on a right side of the vehicle, the motor vehicle includes at least one second nozzle that is mounted at a second position located between the wheels, wherein a medium situated in a second container is capable of escaping through the second nozzle into the surroundings of the motor vehicle with a speed component pointed in an outer direction of the right side of the vehicle; and
    causing, as a function of the detecting, and with an actuator system, on only one side of the vehicle, the medium to escape through the at least one nozzle mounted on the only one side of the vehicle, to stabilize the motor vehicle;
    wherein, to reduce any risk to the surroundings from the escape of gases at high pressure, the discharge orifices have a radiation characteristic which fans out so that the pressure more quickly decreases with increasing distance from the orifices, and
    wherein the discharge orifices are turned upwards from a wheel plane, so that at an inclined position, the opening of the outlet nozzle points at least partially upwards during the discharge of the gas.

2. The method as recited in claim 1, wherein the unstable driving condition includes one of an oversteer, an understeer, and a lateral skidding of the two wheels of the motor vehicle.

3. The method as recited in claim 1, further comprising:
    ascertaining a sideslip angle of the motor vehicle, wherein the unstable driving condition is detected as being present if at least one of the sideslip angle and a rate of increase of the sideslip angle exceeds a specified threshold value.

4. The method as recited in claim 1, further comprising:
    ascertaining a tire slip angle of at least one wheel of the motor vehicle, wherein the unstable driving condition in the lateral direction of the vehicle is detected as being present if at least one of the tire slip angle and a rate of increase of the tire slip angle exceeds a specified threshold value.

5. The method as recited in claim 1, wherein the first position and the second position are located on one of a frame of the motor vehicle, an engine block of the motor vehicle, and on a body of the motor vehicle.

6. The method as recited in claim 1, wherein:
    the first nozzle and the second nozzle are mounted above a center of gravity of the motor vehicle, and
    in response to the presence of the unstable driving condition in the lateral direction of the motor vehicle, the medium flows out through the one of the first nozzle and the second nozzle located on an inside of a curved travel trajectory on which the motor vehicle is traveling.

7. The method as recited in claim 1, wherein:
    the first nozzle and the second nozzle are mounted below a center of gravity of the motor vehicle, and
    in response to the presence of the unstable driving condition in the lateral direction of the vehicle, the medium flows out through the one of the first nozzle and the second nozzle located on an outside of a curved travel trajectory on which the motor vehicle is traveling.

8. The method as recited in claim 1, wherein the medium is a gas stored in a pressure vessel.

9. The method as recited in claim 8, wherein the gas is one of carbon dioxide, nitrogen, helium, argon, and air.

10. The method as recited in claim 1, wherein the medium is a liquid.

11. The method as recited in claim 10, wherein the liquid is compressed water.

12. The method as recited in claim 1, wherein the medium is a gas formed during combustion carried out at one of the first container and the second container.

13. The method as recited in claim 1, further comprising:
    ascertaining a lateral inclination variable indicating a lateral inclination angle of the motor vehicle; and
    changing an orientation of an exhaust port of at least one of the first nozzle and the second nozzle as a function of the lateral inclination variable.

14. The method as recited in claim 1, wherein the first container and the second containers are constructed as a common container.

15. An apparatus for lateral dynamic stabilization of a single-track motor vehicle during cornering, the apparatus comprising:
    an arrangement for detecting a presence of an unstable driving condition in a lateral direction of the motor vehicle, wherein on a left side of the motor vehicle, the motor vehicle includes at least one first nozzle that is mounted at a first position located between wheels of the motor vehicle, wherein a medium situated in a first container is capable of escaping through the first nozzle into surroundings of the motor vehicle with a speed component pointed in an outer direction of the left side of the motor vehicle, wherein on a right side of the vehicle, the motor vehicle includes at least one second nozzle that is mounted at a second position located between the wheels, wherein a medium situated in a second container is capable of escaping through the second nozzle into the surroundings of the motor vehicle with a speed component pointed in an outer direction of the right side of the vehicle; and
    an arrangement for causing, as a function of the detecting, and with an actuator system, on only one side of the vehicle, the medium to escape through the at least one nozzle mounted on the only one side of the vehicle, to stabilize the motor vehicle;
    wherein, to reduce any risk to the surroundings from the escape of gases at high pressure, the discharge orifices have a radiation characteristic which fans out so that the pressure more quickly decreases with increasing distance from the orifices, and
    wherein the discharge orifices are turned upwards from a wheel plane, so that at an inclined position, the opening of the outlet nozzle points at least partially upwards during the discharge of the gas.

* * * * *